US005799764A

United States Patent [19]

Muramatsu et al.

[11] Patent Number: 5,799,764
[45] Date of Patent: Sep. 1, 1998

[54] CAGE HAVING A BEARING FOR USE IN A ONE-WAY CLUTCH

[75] Inventors: Kazuhiko Muramatsu, Fukuroi; Yoshio Kinoshita, Shizuoka-ken, both of Japan

[73] Assignee: NSK-Warner Kabushiki Kaisha, Tokyo, Japan

[21] Appl. No.: 675,023

[22] Filed: Jul. 3, 1996

[30] Foreign Application Priority Data

Jul. 5, 1995 [JP] Japan .................. 7-170022

[51] Int. Cl.⁶ .................................................. F16D 41/07
[52] U.S. Cl. ............................ 192/41.5; 192/113.32
[58] Field of Search .................. 192/45.1, 113.32

[56] References Cited

U.S. PATENT DOCUMENTS

| Re. 29,985 | 5/1979 | Brownhill et al. | 192/45.1 X |
|---|---|---|---|
| 2,724,472 | 11/1955 | Swenson | 192/45.1 |
| 2,879,869 | 3/1959 | Dodge | 192/45.1 |
| 2,888,116 | 5/1959 | Troendly et al. | 192/45.1 |
| 3,324,980 | 6/1967 | Rojic et al. | 192/45.1 |
| 3,937,310 | 2/1976 | Oldfield | 192/45.1 X |
| 4,682,677 | 7/1987 | Message | 192/45.1 X |
| 4,986,402 | 1/1991 | Neuwirth et al. | 192/45.1 X |
| 4,998,605 | 3/1991 | Ferris | 192/45.1 X |

FOREIGN PATENT DOCUMENTS 6-50359  2/1994  Japan .

*Primary Examiner*—Rodney H. Bonck
*Attorney, Agent, or Firm*—Skjerven Morrill MacPherson Franklin & Friel LLP; Thomas S. MacDonald

[57] ABSTRACT

A one-way clutch assembly includes a cage, a plurality of sprags maintained in position by the cage and a plurality of spring members also maintained in position by the cage for keeping the sprags in normal position by applying resilient forces. The one-way clutch is mounted between an inner and an outer rings to control the transmission of power therebetween depending on the direction of relative rotation between the inner and outer rings. The cage has an outer peripheral surface facing the outer ring and an inner peripheral surface facing the inner ring. At least part of at least one of the inner and outer peripheral surfaces is defined as a slide contact or bearing surface against an associated one of the outer and inner rings to avoid the sprags from being damaged. The cage is a combined cage including a male cage half and a female cage half combined together through a pair of spaced male-female connection portions extending between each pair of adjoining sprags.

8 Claims, 8 Drawing Sheets

1

CAGE HAVING A BEARING FOR USE IN A ONE-WAY CLUTCH

BACKGROUND OF THE INVENTION

1. Field of the Invention

This invention generally relates to a one-way clutch which is often used as a component for providing such functions as transmission of torque and back stop in a driving system of an automobile or the like, and, in particular, to improvements in a cage for use in such a one-way clutch.

2. Description of the Prior Art

Conventionally, use has been made of a one-way clutch employing sprags for controlling the transmission of power between concentrically arranged outer and inner rings. In such a sprag type one-way clutch, the sprags change their orientation depending on the relative direction of rotation between the inner and outer rings such that the inner and outer rings are locked or unlocked to thereby establish or release a condition for transmitting power therebetween. Described more in detail in this respect with reference to FIGS. 1A and 1B, in FIG. 1A, an inner ring 4 rotates clockwise relative to an outer ring 2 and thus a sprag 1 is locked between the outer and inner rings 2 and 4, in which case, the outer ring 2 rotates clockwise together with the inner ring 4 as a unit. In such a locked condition, the sprag 1 takes a relatively upright condition so that its height in the radial direction of the one-way clutch becomes relatively high. On the other hand, as shown in FIG. 1B, in the case where the inner ring 4 rotates counterclockwise relative to the outer ring 2, the sprag 1 becomes unlocked between the outer and inner rings 2 and 4. As a result, the inner ring 4 rotates counterclockwise relative to the outer ring 2. In such an unlocked condition, the sprag 1 becomes inclined so that its height in the radial direction of the one-way clutch is relatively low.

A one-way clutch is used as arranged between the outer and inner rings 2 and 4 to control the transmission of power therebetween, whereby a plurality of sprags are arranged in a space between the outer and inner rings 2 and 4 circumferentially as spaced apart from one another and a clutch operation between the outer and inner rings 2 and 4 is effected depending on the orientation of sprags 1. In order to maintain such a plurality of sprags 1 in position, provision is made of a cage which is generally in the shape of a ring and provided with a plurality of openings spaced apart from one another in the circumferential direction. In each of the openings of the cage is provided a corresponding sprag 1 which may move pivotally or rockingly between its locked and unlocked positions as shown in FIGS. 1A and 1B.

While a one-way clutch is in its declutched or freely rotating condition (i.e., the sprag 1 being in its unlocked condition as shown in FIG. 1B), if the outer and inner rings 2 and 4 become decentered or eccentric relative to each other, for example, due to the application of an external force, a plurality of sprags 1 arranged circumferentially become inclined so that their heights change individually. In this case, if the amount of eccentricity is within an allowable range of variations for the height of sprag 1, no particular problem arises. However, if the allowable range has been exceeded, sprags 1 could be damaged, which could result in malfunctioning of the one-way clutch itself. In order to cope with this problem, as shown in FIG. 1C, a bearing member, such as an end bearing 10, was conventionally provided between the outer and inner rings 2 and 4 separately from the cage for retaining a plurality of sprags 1 in position to support the outer and inner rings 2 and 4 such that a gap between the outer and inner rings 2 and 4 is maintained within a predetermined range and thus the amount of eccentricity between the outer and inner rings 2 and 4 is prevented from exceeding the allowable range.

Examples of such a bearing member in the conventional one-way clutch are illustrated in FIGS. 2A and 2B. In the example shown in FIG. 2A, a one-way clutch 9 is disposed between the outer and inner rings 2 and 4 and a pair of ball bearings 8 are disposed on the opposite sides of the clutch 9. In this case, the one-way clutch 9 includes a plurality of sprags arranged circumferentially and a cage for retaining the sprags in position. The gap between the outer and inner rings 2 and 4 is prevented from exceeding a predetermined value by the pair of ball bearings 8. On the other hand, in FIG. 2B, a pair of end bearings 10 are arranged on the opposite sides of the one-way clutch 9 to maintain the gap between the outer and inner rings 2 and 4 at a predetermined value. The end bearing 10 is generally in the shape of a ring and has a C-shaped cross section, and it is typically fabricated by press machining or cutting. With the provision of such bearing members as ball bearings 8 or end bearings 10 on the opposite sides of the one-way clutch 9, the gap between the outer and inner rings 2 and 4 can be maintained to allow the sprags 1 to pivotally move between the locked and unlocked positions smoothly even if some eccentricity occurs between the outer and inner rings 2 and 4. Accordingly, even if some eccentricity occurs between the outer and inner rings 2 and 4 with the sprag 1 located at its most inclined position as shown in FIG. 1B, the sprag 1 is protected by the end bearings 10 so that the sprag 1 is prevented from being damaged.

However, since such bearing members are typically arranged on the opposite sides of a one-way clutch and they are normally manufactured separately from a one-way clutch and assembled with it later, there is a disadvantage in an increase in the number of components and also an increase in manufacturing complexity. Besides, since the bearing members are arranged on the opposite sides of a one-way clutch, there is also a disadvantage in that the unit as a whole necessarily becomes bulky particularly in the axial direction.

Japanese Pat. Laid-open Pub. No. 6-50359 teaches the so-called combined cage comprised of a male and a female cage members, but since it also presupposes to use end bearings, it suffers from the above-described disadvantages of the prior art one-way clutch. This is because, there is a clearance between the cage and the outer and inner rings in the above-described publication which is approximately the same order of magnitude as that of the above-described prior art and thus it clearly suggests that an end bearing be provided at each side of the combined cage.

SUMMARY OF THE INVENTION

In accordance with the present invention, there is provided a cage having a novel structure for use in a one-way clutch, which is generally in the shape of a ring and which has an outer peripheral surface and an inner peripheral surface. The cage is also provided with a plurality of openings, each capable of receiving therein a corresponding sprag in a pivotally movable manner, arranged in a circumferential direction. The cage is characterized in that, when the one-way clutch is mounted between an outer and an inner rings, at least a portion of at least the inner peripheral surface is formed as a slide contact surface relative to the inner ring. As a result, in accordance with a preferred embodiment of the present invention, the cage is so structured to have a bearing function against its associated outer and inner rings. The cage is preferably defined as a combined cage comprised of a male member and a female cage member.

It is therefore a primary object of the present invention to obviate the above-described disadvantages of the prior art and provide a novel cage for use in a one-way clutch, which allows to reduce the number of components of a one-way clutch.

Another object of the present invention is to provide a cage for use in a one-way clutch, which possesses a bearing function at least against either of an inner and an outer rings between which the clutch is mounted.

A further object of the present invention is to provide a cage for use in a one-way clutch, which is simple in manufacture and thus low at manufacturing cost.

A still further object of the present invention is to provide a novel cage for use in a one-way clutch, which allows to make the overall unit compact in size.

Other objects, advantages and novel features of the present invention will become apparent from the following detailed description of the invention when considered in conjunction with the accompanying drawings.

DESCRIPTION OF THE PREFERRED EMBODIMENTS

Figure 1A:
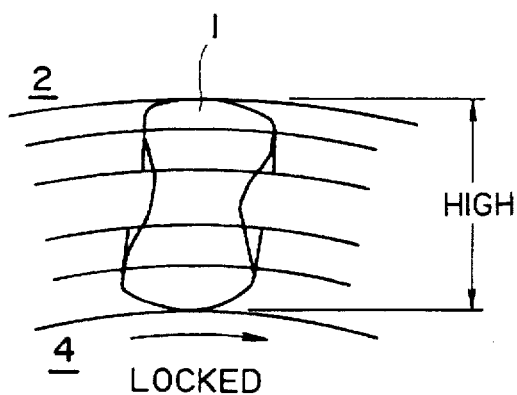
FIGS. 1A, 1B and 1C are illustrations which are useful for explaining the principle of operation of a bearing member in a prior art one-way clutch.
Figure 1B:
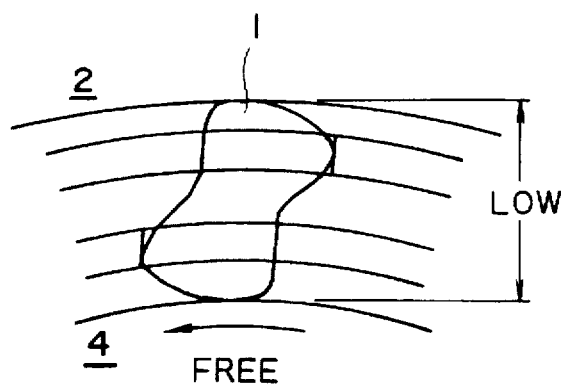
Figure 1C:
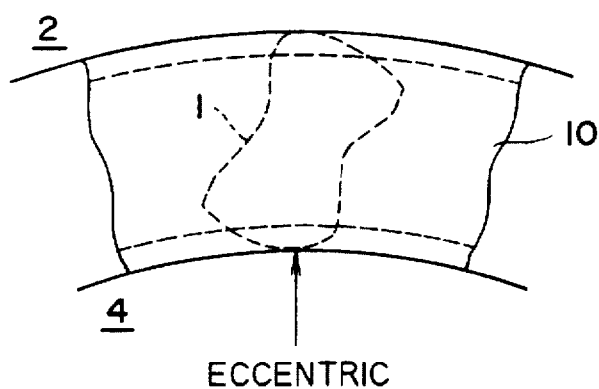
Figure 2A:
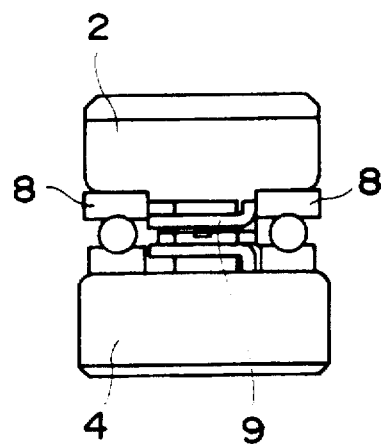
FIGS. 2A and 2B are schematic illustrations showing in cross section two examples of a bearing member in the prior art one-way clutch.
Figure 2B:
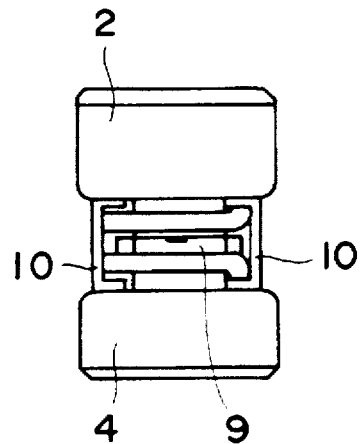
Figure 3:
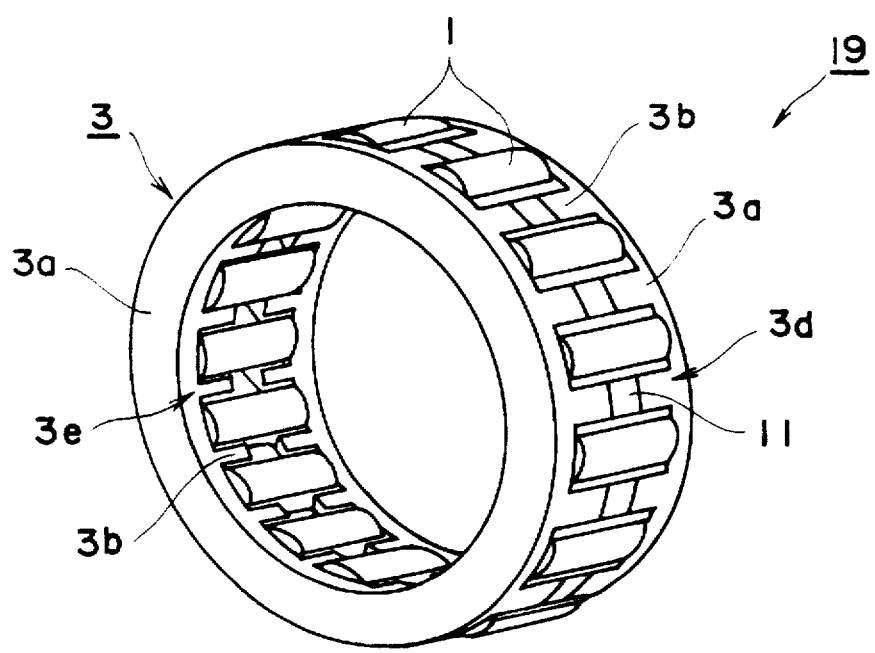
FIG. 3 is a schematic illustration showing in perspective view a one-way clutch incorporating a novel cage constructed in accordance with one embodiment of the present invention.

Referring now to FIG. 3, there is schematically shown a one-way clutch 19 including a cage 3 constructed in accordance with an embodiment of the present invention. The clutch 19 generally includes a plurality of sprags 1 arranged in a circumferential direction spaced apart from one another and the cage 3 for maintaining the sprags 1 in position. The cage 3 is generally annular in shape and has an outer peripheral surface 3d and an inner peripheral surface 3e. The cage 3 is formed with a plurality of openings arranged in the circumferential direction and a corresponding sprag 1 is received in each of the openings in a pivotally or mockingly movable manner. The cage 3 generally includes a pair of side plate portions 3a located at the opposite sides in the axial direction and a plurality of cage cam portions 3b which extend inwardly in the axial direction from each of the side plate portions 3a at a plurality of locations circumferentially spaced apart from one another. As will be described more in detail later, a spring member 11 having a predetermined shape is retained by each of the cage cam portions 3b, and each of the spring members 11 is resiliently in engagement with a pair of adjacent sprags 1 in the circumferential direction. As will also be described more in detail later, the cage 3 is preferably a so-called combined cage, in which case, the cage 3 is advantageously manufactured in two separate parts as a male (left) and a female (right) cage member which are then assembled together to define a combined cage.

Figure 4:
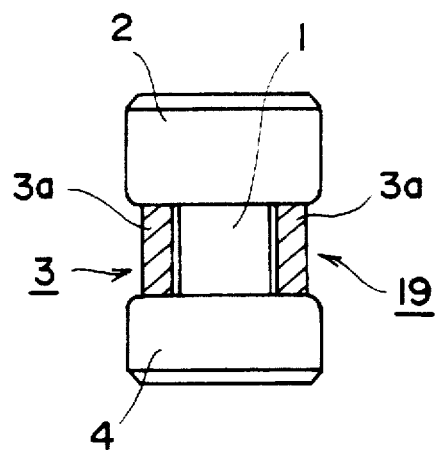
FIG. 4 is a schematic illustration showing partly in cross section a structure in that the peripheral surfaces of side plates of a cage constructed in accordance with one embodiment of the present invention are defined as slide contact surfaces against associated inner and outer rings.

In the one-way clutch 19 shown in FIG. 3, at least a part of at least its inner peripheral surface 3e of cage 3 is defined as a slide contact (or bearing) surface against its associated inner ring. More preferably, the outer peripheral surface 3d of cage 3 is also defined at least partly as a slide contact (or bearing) surface against its associated outer ring. The condition in which the one-way clutch 19 shown in FIG. 3 is mounted between its associated outer and inner rings 2 and 4 is schematically shown in FIG. 4. In this particular embodiment, as shown in FIG. 4, an outer peripheral surface of each of the side plate portions 3a of one-way clutch 19 is defined as a slide contact (or bearing) surface against its associated outer ring 2, and, similarly, an inner peripheral surface of each of the side plate portions 3a of one-way clutch 19 is defined as a slide contact (or bearing) surface against its associated inner ring 4. As a result, the minimum gap between outer and inner rings 2 and 4 in the radial direction is determined by the size of side plate portions 3a of cage 3 in the radial direction. Thus, even if eccentricity occurs between outer and inner rings 2 and 4 due, for example, to application of an external force, sprags 1 can be protected by the side plate portions 3a of cage 3 and thus prevented from being damaged.

Figure 5:
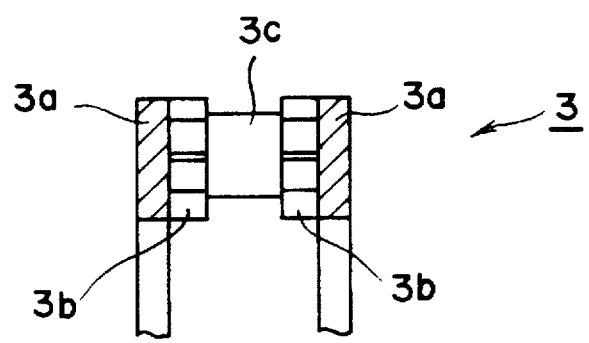
FIG. 5 is a schematic illustration showing partly in cross section a structure in that the peripheral surfaces of cage cam portions of a cage constructed in accordance with one embodiment of the present invention are defined as slide contact surfaces against associated inner and outer rings.

FIG. 5 illustrates a portion of cage 3 including a left side plate portion 3a, a cage cam portion 3b inwardly extending from the left side plate portion 3a, a right side plate portion 3a, a cage cam portion 3b inwardly extending from the right side plate portion 3a, and a cage cam connection portion 3c connecting the corresponding pair of left and right cage cam portions 3b and 3b. As will be described in detail later, it is preferable that the connection portion 3c is, for example, integrally formed with the left side cage cam portion 3b and a recess is formed at a corresponding location at the associated right side cage cam portion 3b to thereby define a male-female structure, whereby the connection portion 3c is fitted into the associated recess to define a combined structure. In the structure shown in FIG. 5, it is to be noted that not only the outer and inner peripheral surfaces 3d and 3e of side plate portion 3a, but also the outer and inner peripheral surfaces 3d and 3e of cage cam portion 3b are defined as parts of slide contact surfaces. In this case, a slide contact surface having the maximum area and a broader expanse in the axial direction is defined to provide an increased load bearing function. Although it may be most preferable to provide a structure shown in FIG. 5, it is also possible to define at least one of outer and inner peripheral surfaces 3d and 3e of cage 3 as a slide contact surface against a corresponding one of outer and inner rings 2 and 4 depending on various conditions in applications, and, moreover, at least a part of each of the peripheral surfaces may be defined as such a slide contact surface.

Figure 6A:
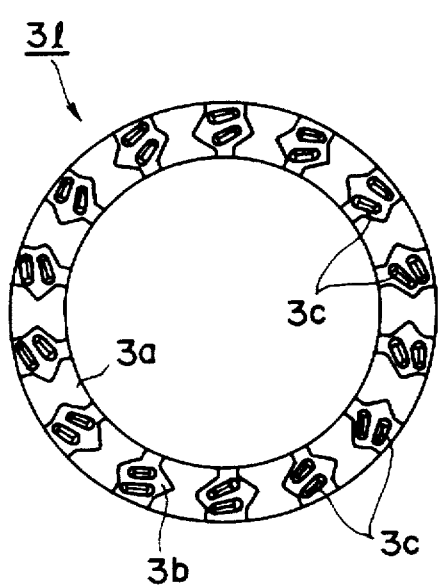
FIGS. 6A and 6B are schematic illustrations showing in plan view a left and a right cage members, respectively, of a two-division type combined cage in accordance with an embodiment of the present invention.
Figure 6B:
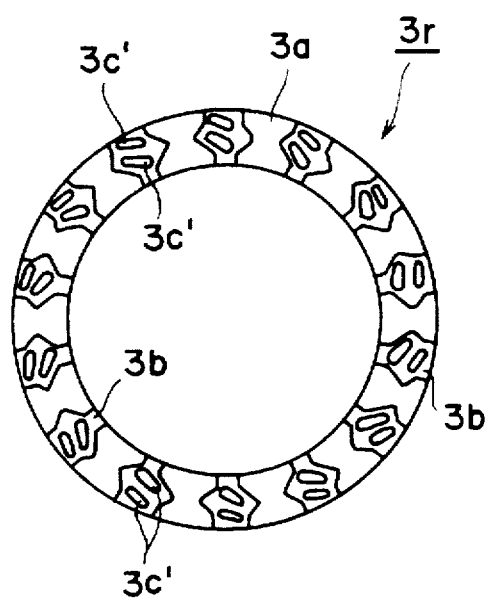
Figure 7A:
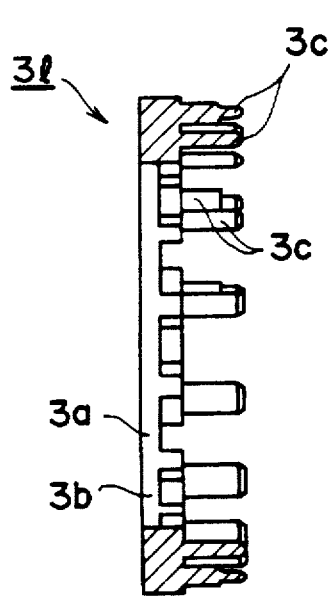
FIGS. 7A, 7B and 7C are schematic illustrations showing in partially cross-sectional side view the left cage member, right cage member and combined cage, respectively, of the two-division type combined cage of FIGS. 6A and 6B.
Figure 7B:
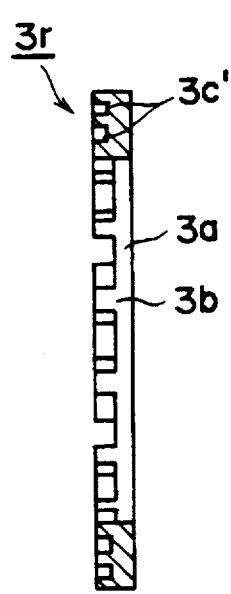
Figure 7C:
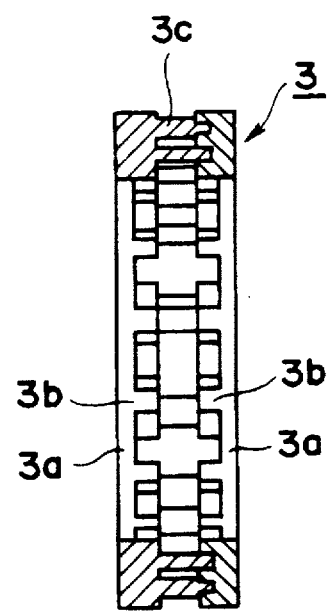

It will now be described as to an embodiment of the present invention where a cage of the present invention is defined as a so-called combined structure with particular reference to FIGS. 6 and 7. FIGS. 6A and 6B illustrate a left cage member 3l (or male cage member in this embodiment) and a left cage member 3r (or female cage member in this embodiment) as divided into two parts left and right. Described also with reference to FIG. 7, the left or male cage member 3l includes a side plate portion 3a, which is generally ring-shaped and provided with a plurality of cage cam portions 3b extending inwardly and arranged circumferentially spaced apart from one another. Each of the cage cam portions 3b is provided with a pair of cage cam connection portions 3c having a predetermined cross sectional shape and extending in the axial direction toward the right cage member 3r. On the other hand, the right or female cage member 3r also includes a side plate portion 3a, which is generally ring-shaped and is provided with a plurality of cage cam portions 3b extending inwardly and located circumferentially spaced apart from one another. The left and right cage cam portions 3b are arranged corresponding in circumferential location. Each of the cage cam portions 3b of right (female) cage member 3r is provided with a pair of recesses 3c' corresponding in location to the pair of connection portions 3c of the left (male) cage member 3l. Thus, after manufacturing the left and right cage members 3l and 3r separately, the connection portions 3c of male cage member 3l can be fitted into the corresponding pair of recesses 3c' of female cage member 3r to define an integrated, combined cage 3 as shown in FIG. 7C.

Such a combined cage 3 can be manufactured by plastic molding, such as injection molding, or alternatively, the cage 3 can also be manufactured by machining using a metal or any other desired material. In addition, in the embodiment shown in FIGS. 6 and 7, although the left cage member 3l is defined as a male side and the right cage member 3r is defined as a female side, the present invention should not be limited to such a specific embodiment and, as a further alternative, the left and right cage members 3l and 3r may be so structured that they both have connection portions 3c and recesses 3c'. In this case, for example, the left and right cage members 3l and 3r may be defined to be of the same structure, in which case the left and right cage members of identical structure can be combined by rotating one to the other along the axis, so that the manufacture can be further simplified with a further reduction in manufacturing cost.

Figure 8:
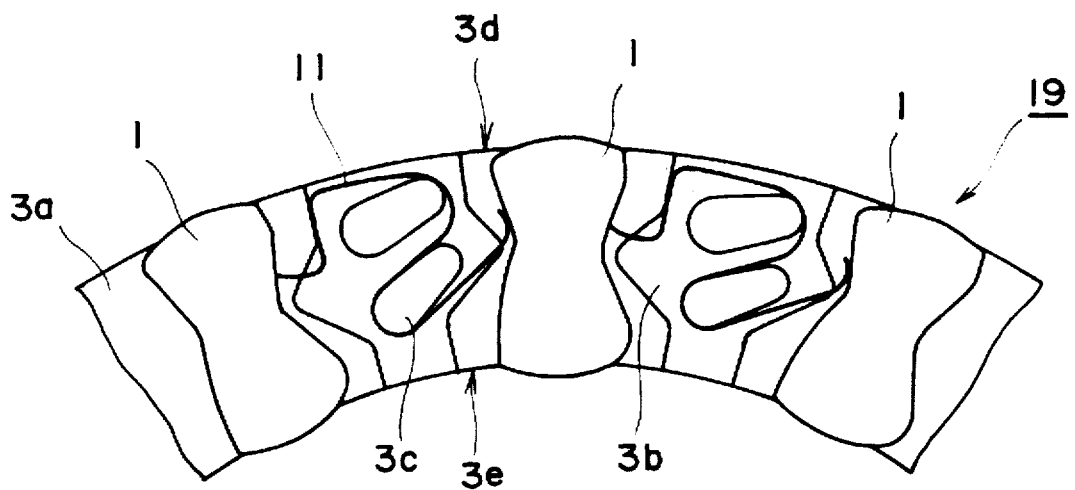
FIG. 8 is an illustration showing part of the overall structure of a one-way clutch incorporating a cage of the present invention.

Now, with reference to FIGS. 8 and 9, it will be described as to a structure and operation of a one-way clutch having a cage constructed in accordance with an embodiment of the present invention. FIG. 8 schematically illustrates a structure in which a cage 3 constructed in accordance with an embodiment of the present invention is assembled into a one-way clutch 19. In this case, the clutch 19 generally includes a plurality of sprags 1, a ring-shaped cage 3 for retaining these sprags 1 in position, and a plurality of spring members 11, each in resilient contact with a pair of associated sprags 1. And, the cage 3 includes a pair of left and right ring-shaped side plate portions 3a, a plurality of cage cam portions 3b provided on the inner surfaces of the side plate portions 3a at a plurality of locations spaced apart from one another and extending inwardly, and a plurality of connection portions 3c, each extending between a pair of corresponding left and right cage cam portions 3b. As is clear from FIG. 8, an opening is defined between a pair of adjacent cage cam portions 3b, and a sprag 1 is provided in the opening in a pivotally or rockingly movable manner. In this case, when the sprag 1 is caused to take its locked or upright position, the sprag 1 tends to project radially outwardly of the opening, whereas, when the sprag 1 is caused to take its unlocked or inclined position, the sprag 1 tends to be hidden in the opening.

Moreover, in the structure shown in FIG. 8, each of the cage cam portions 3b is provided with a pair of connection portions 3c, which are arranged with a specific positional relationship and each have a predetermined cross-sectional shape. A spring member 11 having a specific shape is provided in engagement with the pair of connection portions 3c. Thus, the connection portions 3c also have a role of keeping the spring member 11 in position in a predetermined manner. The spring member 11, in the illustrated embodiment, has a shape generally in the form of number "2" and its opposite ends are in resilient contact with a pair of adjacent sprags 1. With this arrangement, each sprag 1 is maintained in a predetermined location with a predetermined orientation by receiving resilient forces on both sides from two separate spring members 11. Thus, there is provided a sufficient margin in the pivotal or rocking movement of the sprag 1 during clutching operation. In addition, the pivotal or rocking movement of each of the sprags 1 becomes smoother and the sprags 1 can move more quickly between the locked and unlocked positions.

Figure 9A:
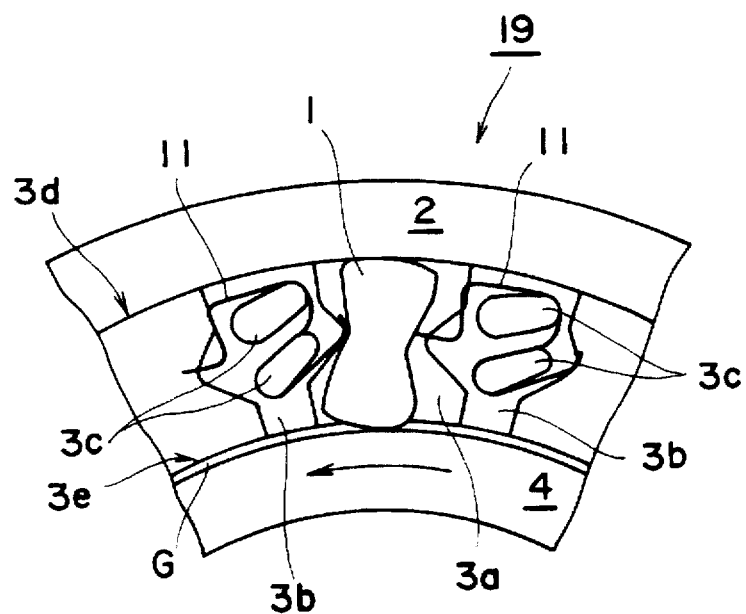
FIGS. 9A and 9B are illustrations which are useful for explaining the operation of the one-way clutch shown in FIG. 8.
Figure 9B:
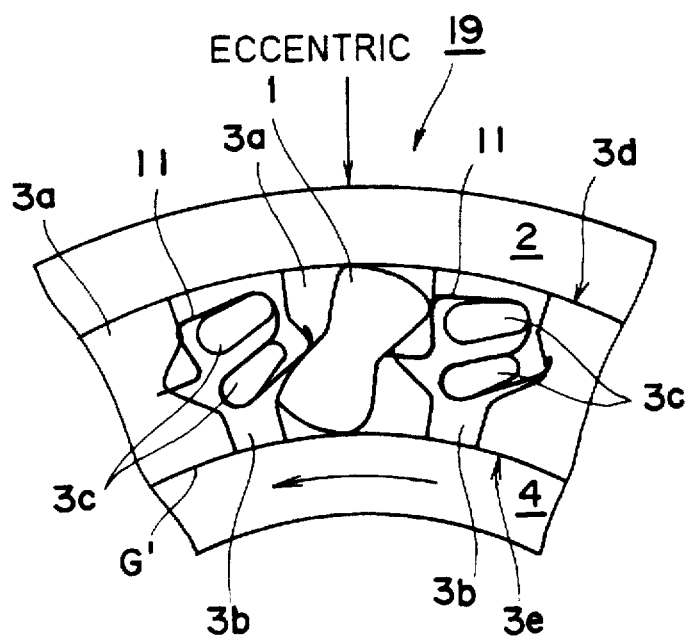

Now, with particular reference to FIGS. 9A and 9B, it will be described an embodiment in which a one-way clutch incorporating a cage embodying the present invention is mounted between an inner and an outer rings. In this embodiment, as is clear from FIG. 9A, the cage of one-way clutch 19 is integrated with the outer ring 2, so that there is no relative rotational movement between the one-way clutch 19 and the outer ring 2. As shown in FIG. 9A, a predetermined clearance G is set between the one-way clutch 19 and the inner ring 4. Under the condition, if the inner ring 4 rotates counterclockwise as shown by the arrow, the sprag 1 is set free or unlocked and thus the inner ring 4 rotates counterclockwise relative to the one-way clutch 19 and the outer ring 2. In this case, no torque is transmitted between the outer and inner rings 2 and 4. While the inner ring 4 rotates in this manner, let us assume that an eccentric load is applied to the outer ring 2 to cause the outer ring 2 to be decentered as, for example, shown in FIG. 9B. As a result, the clearance G is reduced to G', which is substantially zero, so that the inner peripheral surface 3e of cage 3 comes to be in sliding contact with the outer peripheral surface of the inner ring 4. However, in accordance with the present invention, since the inner peripheral surface 3e of cage 3 is defined as a slide contact (bearing) surface, it can support the inner ring 4 temporarily so that it is possible to prevent the sprag 1 from being damaged due to the application of undesired forces.

In the above-described embodiment, although the inner peripheral surface 3e of cage 3 has been defined as a slide contact (bearing) surface, as alternatives, it is also possible to define the outer peripheral surface 3d of cage 3 or both of the inner and outer peripheral surfaces 3e and 3d as a slide contact (bearing) surface. Besides, it is also possible to define at least part of each of the inner and outer peripheral surfaces 3e and 3d as a slide contact surface.

Figure 10:
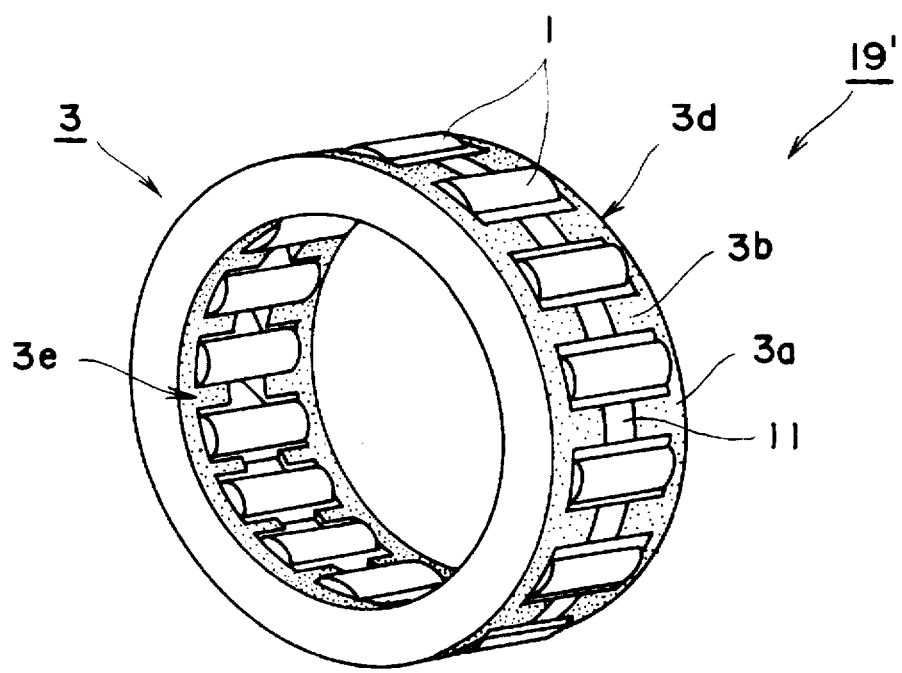
FIG. 10 is a schematic illustration showing in perspective view a one-way clutch incorporating a cage constructed in accordance with another embodiment of the present invention.

Now, turning to FIG. 10, a cage constructed in accordance with a further embodiment of the present invention will be described. In this embodiment, a lubricant retaining structure is provided in each of the outer and inner peripheral surfaces 3d and 3e of a cage 3, which have been defined as a slide contact (bearing) surface. Such a lubricant retaining structure can be provided by forming a number of ups and downs, i.e., a series of ridges such as by knurling, on each of the peripheral surfaces. Such a lubricant retaining knurled structure does not have to be provided across the entire surface of each of the inner and outer peripheral surfaces 3d and 3e, but, instead, it can be provided at least a part of each of the inner and outer peripheral surfaces 3d and 3e, each defined as a slide contact (bearing) surface, depending on applications.

As described above, in accordance with the present invention, the number of component parts of a one-way clutch can be reduced and the manufacture of a one-way clutch can be facilitated and reduced in cost. Besides, it also allows to manufacture a one-way clutch compact in size. The sprag motion and thus the operation of a one-way clutch itself can be made smoother, and the sprags are well protected from being damaged, which contributes to provide a prolonged service life.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A cage for use in a one-way clutch, said cage being generally in the shape of a ring and including an outer peripheral surface and an inner peripheral surface, said cage also including a plurality of openings arranged in a circumferential direction as spaced apart from one another, each opening capable of receiving therein a corresponding sprag in a pivotally movable manner, wherein when said one-way clutch is mounted between an inner ring and an outer ring, at least part of at least said inner peripheral surface being defined as a slide contact surface against the inner ring;

wherein said cage is a combined cage including a male cage half and a female cage half which are combined together through a pair of spaced male-female fitting connection portions extending between two adjoining sprags; and a plurality of spring members, each spring member having distal ends in resilient contact with a side edge of each of two adjoining sprags and each spring member being in engagement with each of said pair of connection portions.

2. The cage of claim 1, wherein at least part of said outer peripheral surface is defined as a slide contact surface against said outer ring.

3. The cage of claim 1, wherein said slide contact surface is provided with a lubricant retaining structure as least partly.

4. The cage of claim 3, wherein said lubricant retaining structure includes a knurled structure provided at least on part of said slide contact surface.

5. The cage of claim 1 wherein said plurality of spring members have a shape generally in the form of a number "2" with curved bight portions of the "2" curved around opposite ends of each of said pair of connection portions.

6. The cage of claim 1 wherein each male cage half and each female cage half includes a ring-shaped side plate portion and a plurality of cage cam portions extending inwardly and circumferentially spaced apart from one another; and wherein each of said cam portions of one of said halves includes a pair of recesses corresponding to the pair of connection portions.

7. A cage for use in a one-way clutch, said cage being generally in the shape of a ring and including an outer peripheral surface and an inner peripheral surface, said cage also including a plurality of openings arranged in a circumferential direction as spaced apart from one another, each opening capable of receiving therein a corresponding sprag in a pivotally movable manner, wherein when said one-way clutch is mounted between an inner and an outer ring, at least part of at least said inner peripheral surface is defined as a slide contact surface against said inner ring;

wherein at least part of said outer peripheral surface is defined as a slide contact surface against said outer ring;

wherein said slide contact surface is provided with a lubricant retaining knurled structure at least on part of said slide contact surface; and wherein said cage is a combined cage including a male cage half and a female cage half which are combined together through male-female fitting connection portions.

8. The cage of claim 7 wherein said male-female fitting connection portions comprise a pair of connection portions extending between each pair of two adjoining sprags of the one-way clutch.

* * * * *